Patented May 19, 1942

2,283,172

UNITED STATES PATENT OFFICE 2,283,172

ZEOLITES AND THEIR TREATMENT

John R. Bates, Swarthmore, Pa., assignor to Houdry Process Corporation, Wilmington, Del., a corporation of Delaware No Drawing. Application October 23, 1937, Serial No. 170,648

13 Claims. (Cl. 252—254)

The present invention relates to contact masses and their preparation. More particularly, it is concerned with the manufacture of contact masses having selected and controlled properties suitable for use in fluid contacting operations to exert catalytic influence over, enter into, or in any way assist chemical or physical changes in which the fluid participates. It has to do with the production and treatment of materials having zeolitic properties and particularly those materials which are prepared from soluble silicates by wet methods.

Artificial zeolites prepared from soluble silicates and other compounds, amphoteric and otherwise, have found wide usage in the treatment of water or for other purposes wherein the base-exchanging capacity of the zeolite is utilized. Many such zeolites have high absorptive capacity which renders them valuable starting materials for the production of catalysts. Catalysts prepared from these zeolites, however, have often failed to have the expected activity or the ability to retain it in use. One cause of low activity has been found to be the presence of sodium introduced in preparing the zeolites. For example, in effecting catalytic transformation of higher boiling into lower boiling hydrocarbons, it has been found that blends of silica and alumina made synthetically from a sodium silicate and an aluminum compound produced higher yields of the desired end product when their content of sodium was reduced.

Attempts have been made to manufacture from zeolites contact or catalytic masses which comprise essentially the nucleus of the zeolite. Some of the proposed methods involved extraction of base exchangeable substance by organic or inorganic acids, while in other methods acid salts were used for this purpose. Such methods have failed to completely remove such materials as sodium or potassium without simultaneously removing appreciable quantities of nuclear or non-exchangeable compounds, e. g., alumina, or without affecting the adsorptivity or structure of the zeolite. Zeolitic displacement of sodium or potassium by a volatile cation has been tried. For example, Way, in 1852, while studying the adsorptive power of soils for manures found that artificial zeolites could exchange a portion of their contained sodium for ammonium when the zeolite was digested in ammonium chloride solution (Journal of the Royal Agricultural Society, volume 13, pages 131 and 132). Way, however, was unable to rid the zeolite of more than a relatively small proportion of its sodium content by this method.

One object of the present invention is to devise improved methods of producing zeolites and other contact masses. Another object is to prepare from artificial zeolites contact masses comprising essentially the nucleus of the zeolites. Another object is to attain the above results without altering to substantial extent the composition of the nuclear or non-exchanging portions of the zeolite. Still another object is to prepare contact or catalytic masses consisting solely of the nuclear or non-exchanging portions of the zeolites and controlled amounts of one or more desirable metallic or oxide ingredients. Other objects will be apparent from the detailed description which follows.

The discovery has now been made that predictable and uncontrollable amounts up to substantially all the sodium or potassium content of a zeolite are capable of removal by base exchange with a solution containing a volatile or unstable cation when in addition to the acid oxide or oxides of the nucleus there is present in the reactants utilized to make the zeolite one or more anions formed from a non-amphoteric element. Accordingly, the invention involves the treatment, with a solution containing a volatile or unstable cation, of a zeolite prepared from ingredients containing a predetermined and controlled amount of one or more suitable anions. Anions capable of forming weak or strong acids are suitable with the exception of those containing amphoteric elements. Common anions well suited for the purpose of the present invention include $Cl^-$, $SO_3^=$, $SO_4^=$, $CO_3^=$, $C_2H_3O_2^-$. The anion may be presented to the reacting ingredients of the zeolitic gel, coagulum, or precipitate as an acid and/or as a salt. In some instances, the anion is present in suitable amount in the reacting ingredients of the zeolite as, for example, in combination with a cation, the oxide of which enters into the non-exchangeable or nuclear portion of the zeolite. This is exemplified by certain zeolites prepared by interreaction of solutions of sodium silicate and certain aluminum salts, e. g., aluminum sulphate, ammonium alum, aluminum chloride, aluminum acetate. In some cases it is necessary to add an additional quantity of an anion in order to have the alkali metal present in removable form. In other cases, there may be no suitable anions in the original reactants whereupon all the anions may be added in a separate solution. Such is the case when, for example, solutions of sodium aluminate and sodium silicate comprise the starting materials for the preparation of a zeolite. The anion-containing compound may then be mixed with the soluble silicate or with the amphoterate, or, after the manner disclosed in my copending application, Serial No. 174,966, filed November 17, 1937, the anion-containing solution may be added to a mixture of solutions containing the nuclear elements of the zeolite and have the additional function of coagulating the same. When the anion is deliberately added as an extra ingredient to the zeolitic forming material it is preferably in the form of a volatile or unstable compound, the cation of which is capable of practically complete removal by a simple physical treatment such as heating, such, for example, as volatile inorganic salts including ammonium chloride, volatile organic salts such, for example, as methylamine hydrochloride, unstable salts such as ammonium sulfate, nitrate, and carbonate, or volatile or unstable acids including hydrochloric acid, formic acid and acetic acid.

The amount of the sodium and potassium content of the zeolite which is rendered easily substituted by the base-exchanging cation is governed by the amount of anion present in the reactants forming the zeolite. The actual amount of anion utilized varies within rather wide limits depending upon the particular anion chosen and is readily ascertained and regulated through control of the pH of the mix. When the reacting solutions, including the anion-containing material, for forming a zeolite containing sodium, for example, are so proportioned that the pH of the mixture is below about 11, the sodium oxide content of the zeolite may be reduced to 1% or less and often below .75% by base exchange with the selected cation, even when the original sodium oxide content of the zeolite is as high as approximately 7 to 9%. In most instances, when the pH of the reacting ingredients is about 10 or below, the sodium oxide content is easily reduced to 0.5% or below, while pH values below 9 permit reduction of the sodium oxide content to about 0.2% at which point the accepted methods of analysis become inadequate for accurate determination. This is considered equivalent to virtual exhaustion of the undesirable component.

The actual removal of sodium or other metallic component or constituent is effected by treating the zeolite with a solution incapable of dissolving nuclear substances by acid reaction and containing the base exchanging cation. The latter must be of a volatile or decomposable nature and susceptible of substantially complete removal from the nuclear substances by the application of heat. The solute may be, and preferably is, a compound which is also of a volatile or decomposable nature, as for example, compounds of ammonium, of amines and of other organic bases. The operation is simple, comprising only contacting the zeolite one or any desired number of times with a solution of the selected compound and may be made at any time after precipitation or coagulation, but preferably after drying and/or washing. A good operation results from the use of a salt which is neutral or practically neutral. Ammonium chloride is one of the best compounds for such use.

In most instances, no more than six, and, usually, four or fewer, successive dips of the zeolite in the chosen base exchanging solution of proper concentration are necessary to remove the desired or required amount of the non-nuclear component or constituent. The operation is efficiently and economically conducted when each dip of the precipitate or coagulum is made in approximately one half of its weight of a base exchanging solution comprising, for example, a 5% to 10% solution of ammonium chloride or a solution containing a stoichiometrically equivalent amount of the ammonium or another desirable volatile or unstable cation. Elevated or superatmospheric temperatures tend to increase the speed of the base-exchanging process. The quantities and concentrations of the base-exchanging solutions are not critical, and, as long as a sufficient amount of the desired cation is present satisfactory results are obtained with relatively larger amounts of more dilute and with relatively smaller amounts of more concentrated solutions. Likewise the number of dips required will usually vary inversely with the relative strength of the solution. Although successive dipping or batch treatment produces the desired result, for reasons of economy, in large scale treatment continuous countercurrent extraction to equivalent extent is utilized. Also, substantial economies in the quantity of base exchanging compound are realized when the precipitate or coagulum is washed free of excess quantities of the undesirable component or constituent and of other soluble substances, such as salts. Preferably, this washing is effected after drying the coagulum or precipitate and with suitably purified water which is free of the undesirable material.

The product resulting from the base exchanging step is a modified zeolite comprising the nucleus of the coagulum or precipitate substantially free of the base exchanging component or constituent originally held therein and zeolitically holding to the extent of its zeolitic capacity a base exchanged component or constituent susceptible of substantially complete removal by heat. The base exchanging step removes substantially none of the nuclear material. In no instance does the nucleus have associated therewith the original base exchanging material in an amount more than that equivalent to 1% by weight of sodium oxide and preferably contains below three-fourths or even one-half or less of that amount. It may contain as a zeolitic component or constituent, as much as approximately 5% by weight of the ammonium ion or radical or an equivalent amount of another volatile or unstable cation. This product, preferably in dried and/or washed form, is capable of and valuable for many purposes including use directly as a zeolitic agent and as an intermediate product in the preparation of further modified contact masses having selective adsorptive or catalytic properties. Such modified contact masses may comprise the original nucleus in substantially pure state, or a compound or molecularly dispersed mixture of the original nucleus and a predetermined and controlled amount of chemically and/or catalytically active material such as metals or metal oxides, which compound or mixture is substantially free of undesired base exchanging components or constituents. One direct use of particular value for the zeolite modified by the first base exchange step is in the preparation of purified water (free, for example, of non-volatile cations such as those of sodium, potassium, calcium or magnesium). Such water is suitable for washing the precipitate or coagulum at any desired stage of treatment. For example, water from any suitable or desired source may be treated in known manner with an ammonium zeolite prepared according to the invention and thus rid of any undesired base exchangeable component.

When the ultimate product is to be the original nucleus in substantially pure form, the modified zeolite is subjected to heat treatment to drive off its content of volatile or decomposable substance. For this purpose, the modified zeolite is simply heated to a temperature below that at which substantial depreciation of the adsorptive properties of the nucleus takes place but substantially above the temperature necessary to dry the same and is held at the selected temperature for a suitable and usually short period of time. When the modified zeolite comprises silica, alumina, and exchangeable ammonium, substantially all the ammonium is usually ejected when the zeolite is held at a temperature within the range of 700 to 1050° F. for a period not in excess of two hours. Higher temperatures have been utilized when it was found that the desired properties of the product were not impaired.

As stated above, a predetermined and controlled amount of other material, including metals and metal oxides may be made a constituent or component of the contact mass. Such material may be inserted into the modified zeolite by base exchange in any desired quantity up to its full base exchange capacity. In order to make such contact masses, the modified zeolite, preferably in dried and washed form, is immersed one or more times in a solution containing cations of the desired metal or metal oxide in proper and regulated concentration. Accurate and rigid control over the amount of the additional material incorporated within the structure of the zeolite is attained through regulation of the strength of solution and of the number of immersions employed, the general tendencies being toward increased base exchange with higher concentrations and greater number of immersions. In this manner, any metallic element in the first to the eighth groups of the periodic table, for example, Cu, Co, Ni, Fe, Mn, Cr, V, W, Li, Cs, Rb, Al, Ca, Sr, Mg, may become a constituent of the end product. Heat treatment of the modified zeolite following introduction thereinto of a metal constituent in zeolitic substitution for any desired portion of its content of volatile or decomposable material may thus produce a contact mass made up of the desired constituents or components in closely regulated proportionate amounts and substantially free of the original base exchanging component. This contact mass has zeolitic capacity in excess of its content of the substituted metallic or metal containing component or constituent.

The following detailed examples offer typical illustrations of the practice of the invention.

*Example 1*

A silica-alumina zeolite was prepared from a solution of sodium silicate comprising about 900 parts by weight of a commercial water glass having a specific gravity of approximately 1.4 ($Na_2O$ content of about 8.9% by weight and $SiO_2$ content of about 28.5% by weight) and about 2500 parts by weight of water by mixing it with an equal volume of a solution containing about 320 parts by weight of commercial ammonium alum ($Al_2(SO_4)_3(NH_4)_2SO_4 \cdot 24H_2O$) and approximately 2800 parts by weight of water, the sulphate anion content of the mixture being equivalent to about its total alkali metal content. Within a short time a gelatinous precipitate formed. This precipitate having a pH of the order of 8 was then dried and washed with purified water until practically free of sulphates. Upon analysis the resulting solid was found to comprise about 84.3% $SiO_2$, 11.7% $Al_2O_3$ and 4% $Na_2O$ (anhydrous basis). It was then immersed for 30 minutes in one half its weight of a 10% solution of ammonium chloride maintained at a temperature of the order of 180° F., removed from the solution and washed with purified water. The immersion and succeeding washing steps were repeated three times and the resulting ammonium zeolite comprising the silica-alumina nucleus and approximately 2.3% by weight of the ammonium radical was divided into three portions.

The first of these portions was used in conventional water treating equipment for the purpose of purifying water utilized in washing other batches of zeolite being processed according to the invention. Periodically, this portion was revivified by treatment with ammonium chloride.

The second portion was heated to approximately 1050° F. and maintained at that temperature for about 2 hours, after which it was cooled and a sample subjected to chemical analysis. This material, found to consist of approximately 87.6% $SiO_2$, 12.1% $Al_2O_3$ and 0.3% $Na_2O$ (anhydrous basis), was used as catalyst in a continuous process for the transformation of higher boiling hydrocarbons into motor fuel involving repeated cycles of alternating periods of transformation and regeneration of the catalyst in place by combustion of burnable deposits formed thereon during the on-stream periods. After many such alternating periods the catalyst was found to have sustained high activity in promoting the desired transformation.

The third portion of the ammonium zeolite was treated to prepare a synthetic contact mass of the type disclosed and claimed in U. S. Patent No. 2,078,951 issued to Eugene J. Houdry on May 4, 1937, and containing about 0.75% Mn. To this end, it was immersed for 30 minutes in about twice its weight of a solution containing approximately 0.85 mols of $MnSO_4$ per liter and maintained at a temperature of the order of 180° F. The resulting zeolite containing manganese was washed until practically free of sulphates, subjected to a heat treatment similar to that described for the second portion of the ammonium zeolite. A sample was analyzed for manganese content, which was found to be about 0.78%. This material was used in a hydrocarbon transforming operation similar to that described above. During such use it was regenerated rapidly and substantially completely at temperatures in the range of 900 to 1000° F.

*Example 2*

A solution of soluble silicate comprising about 2500 parts by weight of commercial sodium silicate having a specific gravity of about 1.4 diluted with approximately 8200 parts by weight of water was prepared. A solution of sodium aluminate was made by dissolving 143 parts by weight of the solid commercial amphoterate containing about 40% by weight of $Na_2O$ and approximately 55% $Al_2O_3$ by weight in 2000 parts of water. 450 parts by weight of a 25% ammonium chloride solution containing the chloride anion in an amount equivalent to about 0.2 the total alkali metal content of the silicate and aluminate solutions was also made. The three solutions were mixed and the resulting coagulum, which had a pH of approximately 11.2, and contained about 7% by weight Na₂O, was washed substantially free of chlorides, and dried. The dried material was given three successive dips in 10% ammonium chloride solution followed by water washing, substantially as described in Example 1. The resulting ammonium zeolite comprising essentially the nucleus of the coagulum holding about 3.8% by weight of the ammonium ion in base exchangeable form was then subjected to a thermal treatment of substantially the same intensity as that described in Example 1. The heat treated product was highly adsorptive, contained only about 0.63% by weight of Na₂O and was found upon trial to be an excellent contact mass for promoting polymerization of gaseous hydrocarbons into motor fuel having high anti-knock rating.

*Example 3*

A solution of sodium silicate of substantially the same strength as described in Example 2 was mixed, in the weight ratio of 560 to 104 with a solution of sodium aluminate of approximately half the strength of that employed in that example. To this mixture there was added about 60 parts by weight of concentrated hydrochloric acid (about 35% HCl) whose content of the chloride anion was equivalent to about 1.4 the total alkali metal content of said mixture, immediately after which addition a gel was formed. This gel, which had a pH of about 4, after being dried and washed free of chlorides was found to contain about 2% by weight of sodium oxide. This zeolite was then given three dips in 5% ammonium chloride solution and a subsequent heat treatment at about 1000° F. for about 2 hours. The resulting product was highly porous and was an active catalyst in the production of high anti-knock motor fuels from higher boiling hydrocarbons, from gaseous hydrocarbons, or from naphthas of lower anti-knock rating. The composition of this product was determined by chemical analysis and compared with the analysis of the dried and washed gel. The base exchanged product was thus found to be, within the limits of experimental error, of the same composition as the nucleus of the gel and contained, in addition, approximately only 0.2% of sodium oxide.

*Example 4*

To 10,700 parts by weight of a solution of sodium silicate of substantially the same strength as used in Example 2, there was added a solution of sodium aluminate made up of 143 parts by weight of solid commercial sodium aluminate diluted with 1000 parts of water. Sufficient acetic acid was then added to the resulting mixture to produce a coagulum having a pH of the order of 8.5. This coagulum after drying and washing was found to contain about 6% of sodium oxide (bone dry basis) and was then immersed for approximately 30 minutes in about one and one half times its weight of a 10% solution of methylamine hydrochloride maintained at a temperature of the order of 150° F. After removal from the base exchanging solution the partially exchanged zeolite was washed and the successive dipping and washing steps repeated three times. The resulting zeolite when analyzed was found to contain only about 0.3% Na₂O and about 5.5% of methylamine susceptible of substantially complete removal by heat treatment at a temperature within the range of 800° F. to 1200 F. or of being zeolitically displaced to any desired extent by any suitable base exchanging solute.

It will be noted from the foregoing examples that in each instance at least nine-tenths of the alkali metal oxide content of the original zeolite was removed by the base exchange solution. Also, as illustrated by the examples, substantially the entire alkali metal oxide content of the zeolite is placed in exchangeable position by utilization in the reacting solutions of the necessary anion of a non-amphorteric element in controlled amount equivalent to 0.2 or more of the total alkali metal content of these solutions, as for example, within the approximate range of such equivalency of 0.2 to 1.4. As indicated in Examples 1 and 3 it is preferred to employ the anion in an amount substantially equivalent to at least the alkali metal content of the reaction mixture, approximately equivalent or greater quantity of anion providing greater ease and completeness of removal of alkali metal in the succeeding base exchange step. Economies of time, equipment and reagents are often obtained when the base exchanging or removal step is made on the original zeolite containing a small part of the salt formed as a result of the coagulating or precipitating reactions. Therefore, it is frequently desirable to wash the coagulum or zeolite until most but not all of such salt or salts is removed prior to the base exchange step. In some instances, it is desired that the final product be in molded form. The base exchanging step or steps may then be conducted either prior to or following the molding operation.

In addition to the uses indicated above contact masses prepared according to the invention and having adsorptive and/or catalytic ability find wide application in many other fields and branches of chemical industry, including processes for effecting: synthesis of ammonia and sulphuric acid; hydrogenation, controlled oxidation, refining and other treatment of hydrocarbons and their derivatives; combustion of carbon monoxide; refining of gases; and classification of gases by selective adsorption. The substantially pure nucleus of a silica alumina zeolite, for example, may be used as or in active catalysts for promoting many chemical reactions and as contact masses where selection of one or more ingredients from a mixture of fluids is effected by adsorption. When the product contains a suitable metal containing constituent it finds application in a great number of processes to promate chemical reactions and/or to remove by chemical action undesired or contaminating components from mixtures containing the same.

Use of contact masses of the nature disclosed herein to promote formation of valuable decomposition products from hydrocarbons is disclosed and claimed in my copending applications, Serial No. 310,762, filed December 23, 1939; Serial No. 365,923, filed November 16, 1940; and Serial No. 365,924, filed November 16, 1940, each of which is in part a continuation of this application.

I claim as my invention:

1. The process of preparing synthetic contact masses comprising the steps of preparing a zeolitic gel or precipitate by interaction in solution of an alkali metal silicate and a compound of an amphoteric metal, including in the solution a quantity of an anion of a non-amphoteric element equivalent to at least 0.2 the total alkali metal oxide content of said mixture and sufficient to place substantially the entire alkali metal oxide content of the resulting zeolitic product in base exchangeable position, and reducing the alkali metal content of the zeolite to an amount below that molecularly equivalent to 1% by weight of sodium oxide by base exchanging it with a compound of a volatile or decomposable cation selected from the group consisting of ammonium and amines which compound is capable of affecting substantially only the alkali metal in the zeolite.

2. The process of preparing synthetic contact masses comprising the steps of preparing a zeolitic gel or precipitate by interaction in solution of an alkali metal silicate and a compound of an amphoteric metal, including in the solution a quantity of an anion of a non-amphoteric element equivalent to at least 0.2 the total alkali metal oxide content of said mixture and sufficient to place substantially the entire alkali metal oxide content of the resulting zeolitic product in base exchangeable position, reducing the alkali metal content of the zeolite to an amount below that molecularly equivalent to 1% by weight of sodium oxide by base exchanging it with a compound of a volatile or decomposable cation selected from the group consisting of ammonium and amines which compound is capable of affecting substantially only the alkali metal in the zeolite, and thereafter subjecting the zeolite to heat treatment at temperature sufficiently high to drive off said cation to yield a product consisting essentially of the nucleus of the zeolite.

3. The process of preparing synthetic contact masses comprising the steps of preparing a zeolitic gel or precipitate by interaction in solution of an alkali metal silicate and a compound of an amphoteric metal, including in the solution a quantity of an anion of a non-amphoteric element equivalent to 0.2 to 1.4 the total alkali metal oxide content of said mixture and sufficient to place substantially the entire alkali metal oxide content of the zeolite in base exchange position, and reducing the alkali metal content of the zeolite to an amount below that molecularly equivalent to 1% by weight of sodium oxide by base exchanging it with an ammonium salt.

4. The process of preparing synthetic contact masses comprising the steps of preparing a zeolitic gel or precipitate by interaction in solution of an alkali metal silicate and a compound of an amphoteric metal, including in the solution a quantity of an anion of a non-amphoteric element equivalent to at least 0.2 the total alkali metal oxide content of said mixture and sufficient to place substantially the entire alkali metal oxide content of the resulting zeolitic product in base exchangeable position, base exchanging the zeolite with a compound of a base exchangeable volatile or unstable cation susceptible of removal from the zeolite upon application of heat until the total alkali metal content of the zeolite is reduced below the amount molecularly equivalent to 1% by weight of sodium oxide, base exchanging a metallic cation into the resulting modified zeolite in an amount molecularly equivalent to less than the quantity of the aforesaid volatile or unstable cation, and heating the zeolite containing said metallic cation to drive off remaining volatile or unstable cation.

5. The process of preparing synthetic contact masses comprising the steps of preparing a zeolitic gel or precipitate by interaction in solution of an alkali metal silicate and a compound of an amphoteric metal, including in the solution a quantity of an anion selected from the group consisting of $Cl^-$, $SO_3^=$, $SO_4^=$, $NO_3^-$, $CO_3^=$ and $C_2H_3O_2^-$ equivalent to at least 0.2 the total alkali metal oxide content of said mixture sufficient to place substantially the entire alkali metal oxide content of the zeolite in base exchangeable position, and base exchanging the zeolite with an ammonium salt until substantially its total content of alkali metal is removed.

6. The process of preparing synthetic contact masses comprising the steps of preparing a zeolitic gel or precipitate by interaction of a solution of a soluble silicate and a solution of a salt of an amphoteric metal, including in the reaction mixture a quantity of an anion of an amphoteric element equivalent to at least the total alkali metal oxide content of the mixture and sufficient to place substantially the entire alkali metal oxide content of the zeolite in base exchangeable position, and reducing the alkali metal content of the zeolite to an amount below that molecularly equivalent to 1% by weight of sodium oxide by base exchanging the alkali metal for a volatile or unstable cation susceptible of removal from the zeolite upon the application of heat.

7. The process of preparing synthetic contact masses comprising the steps of preparing a zeolitic gel or precipitate by interaction of a solution of an alkali metal silicate and a solution of an alkali metal amphoterate, including in the reaction mixture an anion of a non-amphoteric element in a quantity equivalent to at least the total alkali metal oxide content of the mixture sufficient to place substantially the alkali metal oxide content of the zeolite in base exchangeable position, and reducing the alkali metal content of the zeolite to an amount below that molecularly equivalent to 1% by weight of sodium oxide by base exchanging the alkali metal for a volatile or unstable cation susceptible of removal from the zeolite upon the application of heat.

8. In preparing active and stable catalysts for promoting hydrocarbon reactions under conditions which produce contaminating deposit and capable of maintaining high catalytic activity despite frequent and repeated regenerations by combustion of said deposit, comprising the steps of preparing a zeolitic gel or precipitate by interaction in solution of an alkali metal silicate and a compound of alumina, including in the reaction mixture an anion of a non-amphoteric element selected from the group consisting of sulphate, chloride and nitrate in quantity equivalent to at least 0.2 the total alkali metal oxide content of the mixture sufficient to place substantially the entire alkali metal oxide content of the zeolite in base exchangeable position, reducing the alkali metal content of the zeolite to an amount below that molecularly equivalent to 1% by weight of sodium oxide by base exchanging it with an ammonium salt, and thereafter subjecting the zeolite to heat treatment to drive off the ammonium content thereof.

9. In preparing synthetic contact masses the steps comprising preparing a zeolitic gel or precipitate by interaction in solution of an alkali metal silicate and a compound of alumina, including in the reaction mixture the sulphate anion in an amount substantially equivalent to the alkali metal oxide content of said mixture, and removing substantially the entire alkali metal content of the zeolite by base exchanging it with a compound of a volatile or decomposable cation selected from the group consisting of ammonium and amines which compound is capable of affecting substantially only the alkali metal in the zeolite.

10. In preparing synthetic contact masses the steps comprising preparing a zeolitic gel or precipitate by interaction between an alkali metal silicate and an aluminum sulphate, controlling the quantity of the sulphate anion in the reaction mixture to an amount above 0.2 the equivalent to the alkali metal oxide content of said mixture and sufficient to place substantially the entire alkali metal oxide content of the zeolite in base exchangeable position, and reducing the alkali metal content of the zeolite to an amount below that molecularly equivalent to 1% by weight of sodium oxide by base exchanging it with a salt of a volatile or decomposable cation selected from the group consisting of ammonium and amines.

11. In the production of valuable contact masses, the step of washing the mass with purified water which has been freed of non-volatile cations by contacting said water with a zeolite which is substantially free of non-volatile and alkali metal base exchangeable components.

12. In the modification of zeolites to produce valuable contact masses involving substitution by base exchange of a volatile or unstable cation for non-nuclear substance in the zeolite, the process comprising washing the zeolite during its treatment with a purified water which has been freed of alkali metal cations by treatment with a zeolite substantially free of said cations in exchangeable form and containing a volatile or unstable cation as a base exchanging component.

13. In the modification of zeolites to produce valuable contact masses involving removal by base exchange of alkali metal cation present therein, the process comprising contacting the zeolite during its treatment with a purified water which has been freed of alkali metal cations by treatment with a zeolite substantially free of said cations in exchangeable or soluble form but containing an exchangeable cation selected from the group ammonium and amines.

JOHN R. BATES.

CERTIFICATE OF CORRECTION.

Patent No. 2,283,172. May 19, 1942.

JOHN R. BATES.

It is hereby certified that error appears in the printed specification of the above numbered patent requiring correction as follows: Page 1, second column, line 19, for "uncontrollable" read --controllable--; page 4, second column, line 12, for "non-amphorteric" read --non-amphoteric--; and that the said Letters Patent should be read with this correction therein that the same may conform to the record of the case in the Patent Office.

Signed and sealed this 30th day of June, A. D. 1942.

(Seal)

Henry Van Arsdale,
Acting Commissioner of Patents.